United States Patent [19]
Gurvitch et al.

[11] Patent Number: 5,896,005
[45] Date of Patent: Apr. 20, 1999

[54] HIGH SPEED SOLID STATE OPTICAL DISPLAY

[75] Inventors: Michael Gurvitch, Stony Brook; Maurice Halioua, Sea Cliff, both of N.Y.; Alexander Kastalsky, Wayside, N.J.; Sylvain Naar, Scarsdale; Sergey Shokhor, Sound Beach, both of N.Y.

[73] Assignee: Copytele, Inc., Huntington Station, N.Y.

[21] Appl. No.: 08/791,032

[22] Filed: Jan. 29, 1997

[51] Int. Cl.$^6$ .................. G02F 1/36; H01J 31/02
[52] U.S. Cl. .................. 313/498; 359/263; 359/265; 359/269; 359/270; 359/267
[58] Field of Search .................. 313/498, 501, 313/506; 359/263, 265, 269, 270, 267, 318, 302

[56] References Cited

U.S. PATENT DOCUMENTS

| | | | |
|---|---|---|---|
| 3,995,943 | 12/1976 | Jasinski | 350/160 R |
| 5,293,546 | 3/1994 | Tardos et al. | 359/269 |
| 5,724,176 | 3/1998 | Nishikitani et al. | 359/269 X |

FOREIGN PATENT DOCUMENTS 0105127  6/1983  Japan.

OTHER PUBLICATIONS

Cope, et al., High–speed solid state thermal switches based on vanadium dioxide, Brit. J Appl. Phys., Ser. 2, vol. 1, pp. 161–168, 1968. No month.

Verleur, et al., Optical Properties of $VO_2$ between 0.25 and 5 eV, Physical Review, vol. 172, No. 3, pp. 788–798, 15 Aug. 1968.

Berglund, et al., Hydrostatic–Pressure Dependence of the electronic properties of $VO_2$ Near the Semiconductor–Metal Transition Temperature, Physical Review, vol. 185, No. 3, pp. 1034–1039, 15 Sep. 1969.

W.R. Roach, Holographic Storage in $VO_2$, Applied Physics Letters, vol. 19, No. 11, pp. 453–455, 1 Dec. 1971.

J. Duchene, $VO_2$ film devices, Microelectronics, vol. 4, No. 3, pp. 37–40, 1972. No month.

A. W. Smith, Optical storage in $VO_2$ films, Appl. Phys. Lett., vol. 23, No. 8, pp. 437–438, 15 Oct. 1973.

F.A. Chudnovskii, Metal–semiconductor phase transition in vanadium oxides and technical applications, Sov. Phys. Tech. Phys., vol. 20, No. 8, pp. 999–1012, Aug. 1975.

Fan, et al., Thin–film $VO_2$ submillimeter–wave modulators and polarizers, Applied Physics Letters, vol. 31, No. 1, pp. 11–13, 1 Jul. 1977.

Fukuma, et al., Preparation of $VO_2$ thin film and its direct optical bit recording characteristics, Applied Optics, vol. 22, No. 2, pp. 265–268, 15 Jan. 1983.

*Primary Examiner*—Ashok Patel
*Attorney, Agent, or Firm*—Plevy & Associates

[57] ABSTRACT

A display device is disclosed including a plurality of pixels arranged in a predetermined configuration. Each pixel including a mirror element disposed over a flat surface. A light modulating material disposed over the mirror element for selectively modulating a predetermined wave length of light received from an external source by transitioning between a first and a second state. The light modulating material in the first state causes destructive interference in the predetermined wave length of light and in the second state causes constructive interference in the predetermined wave length of light.

13 Claims, 6 Drawing Sheets

5,896,005

HIGH SPEED SOLID STATE OPTICAL DISPLAY

BACKGROUND OF THE INVENTION

1. Field of the Invention

The present invention relates generally to flat panel display devices and more particularly, to a phase transition flat panel display including Vanadium Dioxide (VO2)—based pixels in order to electrically modulate light by utilizing the phase transition property of VO2.

2. Description of the Prior Art

Display devices are conventionally classified into two basic categories including active and passive displays. Active displays which are light generating devices include such technologies as Cathode Ray Tubes (CRT), Light Emitting Diodes (LED) and Plasma Display Panels (PDP), while passive displays are light modulating devices where the light source is either ambient or light from a separate source and includes such technologies as Liquid Crystal Displays (LCD), Electrochromic Displays (ECD) and Electrophoretic Displays (EPID).

Another classification for displays relates to the physical size or geometry of the device. Flat Panel displays are generally more compact and energy efficient, and utilize practically all of the above mentioned technologies except for CRT technology. Attempts to flatten the conventional CRT have been unsuccessful since the devices produced have had either poor picture quality or excessive manufacturing costs.

A very successful type of Flat Panel Display is the LCD device. The LCD includes a plurality of pixels arranged in a matrix configuration utilized to either transmit or block light. Whether light is transmitted or blocked, depends on the alignment of the liquid crystal molecules which is controlled by an electrical bias. The early LCDs utilized a "passive matrix" scheme in order to address the individual pixels when producing images. This scheme consists of applying a voltage to a single row and then adjusting the column voltages to produce a large combined voltage across the selected pixels in that row. This addressing scheme enabled the early LCDs to be efficient and low cost. However, due to a cross talk complications, the Passive Matrix LCDs cannot provide both good contrast and resolution.

In order to overcome the cross talk problem, the "active matrix" scheme was developed for LCD devices. This scheme utilizes an array of transistors in order to address the individual pixels. Each pixel receives a voltage from its column line only when its own transistor is switched on. This enables Active Matrix LCDs to provide good resolution as well as good contrast. However, these devices have some drawbacks. First of all, these type of displays draw more power than a display utilizing the "passive matrix" scheme. These types of displays are also more expensive and complicated to produce. Another drawback is that these type of displays tend to have lower yields due to the difficulty of fabricating the transistor arrays which is needed to perform the "active matrix" addressing.

Another type of flat panel display is the ECD device. The ECD device generally includes a cell with at least two electrodes where at least one consists of electrochromic material, an electrolyte and at times an insulator. Applying a voltage across the electrodes causes ions present in the electrolyte to be absorbed by one of the electrodes thereby producing a change of color or transmissive property in the electrode. The change in color or transmissive property is the effect that enables these types of displays to produce images.

VO2 exhibits an insulator-to-metal phase transition at temperature $T_c=68°$ C. which is accompanied by a significant change in electrical and optical properties. Due to this feature this material has been utilized in various electrical and optical applications. These applications have included: a medium for holographic optical recording, a temperature stabilizer and controller, an electronic switch, material for screening and modulating microwave radiation and electronic and optical memory elements. One of the optical properties which is significantly changed is the index of refraction, which would enable VO2 to modulate light reflectance. The phase transition in VO2 can be thermally induced by utilizing heater elements disposed under the film of this material. Some primitive display functions have been demonstrated earlier, with modulation of the reflectance of the VO2 with an external heater. The latter heated the glass substrate as well, causing a high power consumption and a long response time of 0.2–0.5 s.

It is therefore, an object of the present invention to provide an improved Flat Panel Display by employing phase transition of the pixelized VO2 film in a new embodiment which allows selective heating of the light modulating film and more efficient use of this material to provide new display functions and properties, such as video frequency of operation, high resolution, gray levels and color, together with a low dissipating power and utilizing well established manufacturing technique which provides high yield and lower cost.

SUMMARY OF THE INVENTION

A display device is disclosed which comprises a plurality of pixels arranged in a predetermined configuration. Each pixel includes a mirror element disposed over a flat surface. A light modulating material, namely the film of vanadium dioxide (VO2), or vanadium dioxide doped with transition metal elements Niobium (Nb) and Tungsten (W) to reduce the critical temperature of the phase transition, is disposed over the mirror element for selectively modulating light, received from an external source, by transitioning between a first and a second phase state. The light modulating material, together with the mirror underneath of it, creates an optical resonator whose reflectance is sensitive to the optical wavelength. As a result of the modulation of the index of refraction due to the phase transition, the resonator properties are changed, which causes the modulation in the intensity of the reflected light.

Additional features are also disclosed which include a heating element, an insulating layer and a top protective and/or reflective layer. The heating element is disposed beneath the mirror element. The insulating layer is disposed between the heating and mirror elements. The protective and/or reflective coating is disposed over the light modulating material. The heater of each pixel is connected in series to a diode implemented as a p-n junction and made separately from the pixel on the display substrate. The diodes are needed to eliminate the current spread which otherwise inevitably occurs in the matrix of resistive elements (heaters). The use of silicon substrate warrants high quality and high yield of the diodes and enables use of Silicon micro-mechanical (MM) and integration circuit (IC) technologies for both pixel and driver fabrication. In another embodiment, the VO2 film is disposed over the metallic heater film, which in this case functions also as a mirror, thereby eliminating the top insulating layer and placing the heater in direct contact with the active VO2 layer.

To minimize heat dissipation through the substrate and thus to bring temperature decay time to the desired level of several milliseconds, an air gap between the pixel and the substrate is made by using MM fabrication technique. The pixel is made as a membrane suspended over the recessed areas in the substrate. To further reduce heat dissipation and increase the decay time, the whole substrate can operate in vacuum, so that the air gap becomes the vacuum gap. This is the preferred embodiment of the present invention.

A passive matrix addressing scheme is used to drive the display. This approach is known to be the simplest and provide high manufacturing yield. An improved driving scheme, in which the display area is subdivided into stripes with limited number of columns in each stripe, is utilized to minimize the effect of current crowding at the row port. To reduce the current amplitude through the heaters, the display area is further subdivided into four quadrants, and four drivers are simultaneously used in the display operation.

A new mode of pixel activation is employed, in which small amplitude current pulses are applied to the heater to maintain the pixels in an "on"- state by keeping the pixel temperature above the phase transition critical temperature. Small amplitude pulses are also applied to the pixel in the "off"-state, while the display substrate is held at room temperature. This driving scheme allows better control of the heat dissipation process and lowers the operational power.

The digital method of producing the gray levels is based on averaging of the number of "on"-and "off"- states occupied by each pixel over several frame periods. Increase of the number of the periods in the metallic ("on") state will make the pixel image darker. To minimize the number of phase transitions during this operation, all "on"- and "off"-periods must be collected into separate time domains, with sequential repetition of the same state in each of these domains.

The pixel color is achieved by variation of the thickness of the light reflecting film and the protective film on top of it. These films together with the mirror underneath of them create an optical resonator sensitive to the wavelength.

BRIEF DESCRIPTION OF THE DRAWINGS

The above objects, further features and advantages of the present invention are described in detail below in conjunction with the drawings, of which.

DETAILED DESCRIPTION OF THE DRAWINGS

The present invention is directed to a Phase Transition Display (PTD) which is implemented in a flat panel configuration. The phase transition display utilizes the thermally induced phase transition property of Vanadium Oxide (VO2) films included in the pixels of the display in order to electrically modulate light for producing images. The reflective mode of the PTD allows the use of a non-transparent substrate, such as Silicon substrate, which makes the device processing compatible with well developed Silicon technologies. Another advantage is that it enables the use of a "passive matrix" addressing scheme, which implies high manufacturing yield and low production costs.

The phase transition property of VO2 relates to this material transitioning between an insulator and a metal state. In the insulator state, VO2 has a lower conductivity and index of refraction, while in the metal state VO2 has a higher conductivity and index of refraction. The change in the index of refraction is what enables the VO2 films to modulate light. The transition from the insulator to the metal state is achieved by heating the VO2 above its critical temperature $(T_c)$ which is approximately 68° C., while the transition to the insulator state occurs when the VO2 is cooled to a temperature below $T_c$. The transition temperatures to- and from- one state are different due to hysteresis of the VO2 film. The latter can be controlled in the process of film manufacturing to meet specific design parameters.

Figure 1:
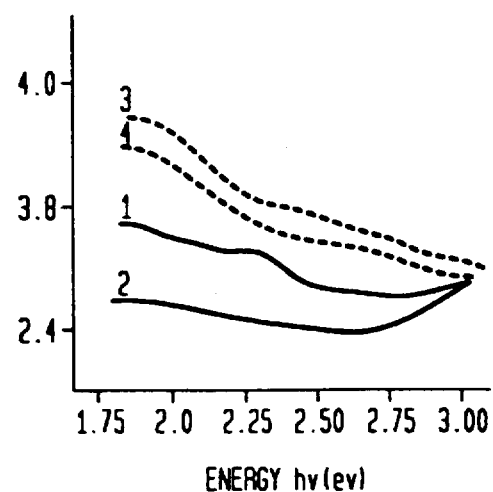
FIG. 1 is a graph plotting the index of refraction (n) of VO2 as a function of the wavelength (λ) of light.

Referring to FIG. 1, shows a graph plotting the index of refraction (n) of VO2 as a function of the wavelength (λ) of light is shown. This graph illustrates the spectral dependence of n for the two phases of VO2. Curves 1 & 2 represent a film of VO2 having a thickness of 185 nm, where Curve 1 is for the metal state and Curve 2 is for the insulator state, while Curves 3 & 4 represent a film of VO2 having a thickness of 60 nm, where Curve 3 is for the metal state and Curve 4 is for the insulator state. As can be seen, there is a large change in the index of refraction in the visible spectral range, between 400 nm and 700 nm. The following table illustrates typical changes in the index of refraction (Δn) that occur due to the phase transition of VO2 for the three important wavelengths in blue, green and red spectral ranges:

| λ (μm) | Δn |
| --- | --- |
| 0.48 (blue) | 0.28 |
| 0.51 (green) | 0.320 |
| 0.63 (red) | 0.54 |

The large observed Δn, as in the above table, is an important feature of the present invention since it enables the light intensities of the above three wavelengths to be efficiently modulated. This allows the implementation of color without the use of a color filter.

Figure 2:
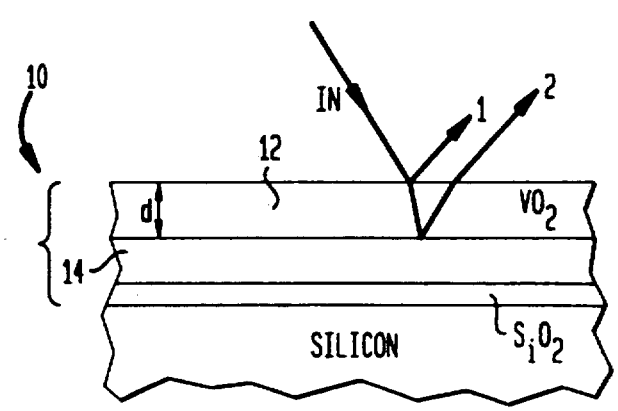
FIG. 2 is a diagram of the optical resonator utilized in the present invention.

Referring to FIG. 2, there is shown a diagram of an optical resonator. It consists of a film of VO2 12 deposited on a layer of Aluminum (Al) 14 serving as a mirror. The optical resonator 10 demonstrates the basic operation of an individual VO2-based pixel according to the present invention. The VO2 film 12 deposited on the Al mirror 14 represents the optical resonator having a reflectance coefficient (R) which is dependent on the phase state of the VO2 12. For certain wavelengths satisfying the resonant conditions, a change of the index of refraction alters the optical interference pattern causing a strong modulation of the optical reflection. Depending on thickness (d) of the VO2 film 12 and the wavelength of the reflected light, two waves reflected from the top of the VO2 12 and Al mirror 14 create either a constructive interference pattern or a destructive one depending on the phase state of the VO2 film 12. The constructive interference causes the intensities of the two beams of equal intensities to be combined providing the maximum amount of reflection or the largest R value, which for the normal incidency is satisfied by the following equation:

$$2dn(T)=m\lambda, \; m=1,2,3 \tag{1}$$

The destructive interference occurs when the two beams are out of phase and thus cancel each other, which provides the minimum amount of reflection or R value. This condition is satisfied by the following equation:

$$2dn(T)=(2m-1)\lambda/2, \; m=1,2,3 \tag{2}$$

In the case of a relatively wide spectral range of light (such as ambient light), to obtain a total modulation of the reflectance one has to integrate the effect of different wavelengths involved.

It should be further noted that varying the thickness (d) of the VO2 film 12 changes the wavelength corresponding to the resonant conditions of the optical resonator 10, thus providing a basis for color display operation, which will be described in detail later.

Figure 3:
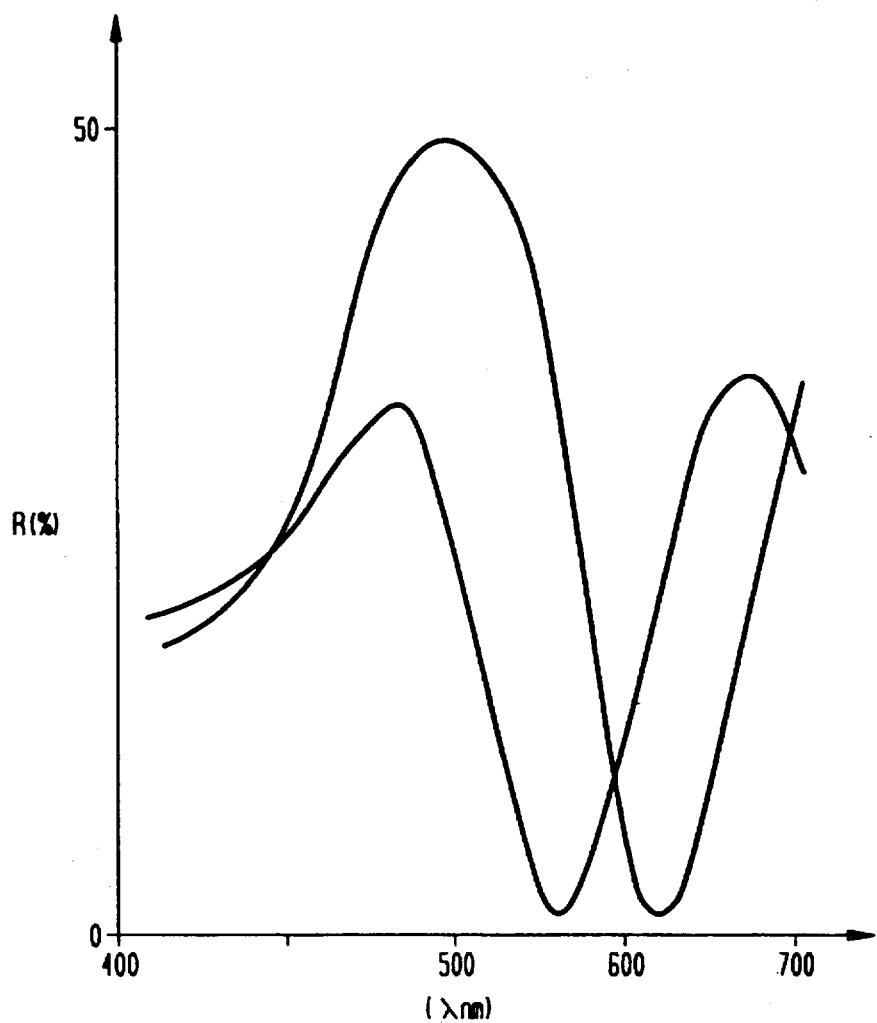
FIG. 3 is a graph plotting the percent change in the reflective coefficient (R) of the optical resonator below and above the critical Temperature $(T_c)$ as a function of the wavelength.

Referring to FIG. 3, a schematic graph plotting the percent change in the reflective coefficient (R) for the previously described optical resonator as a function of the wavelength is shown. As it can be readily observed, the value of R depends on the λ for both the metal state (T>Tc) and insulator state (T<Tc). Having the spectral minimum at its lowest values of R results in an extremely strong reflectance modulation for the corresponding to this minimum wave lengths and therefore in a very high contrast ratio.

Figure 5:
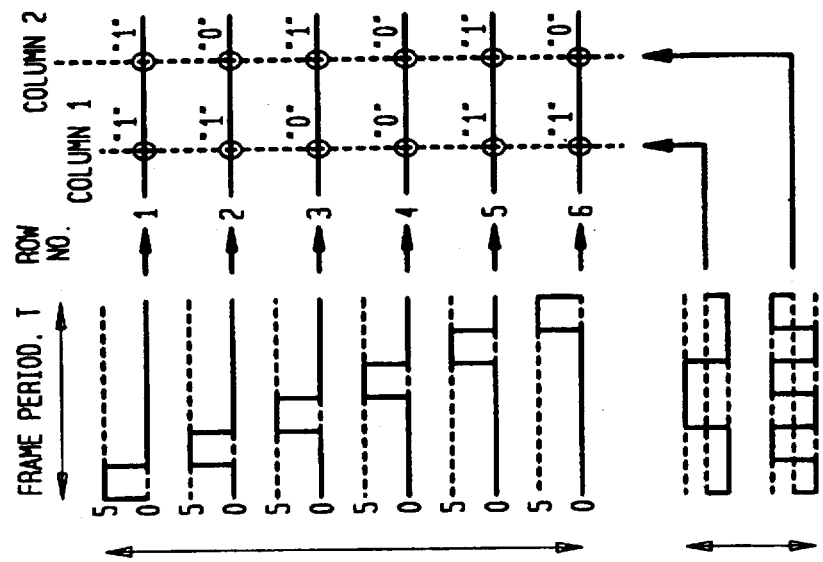
FIG. 5 is a diagram illustrating the addressing scheme within a single stripe utilized by the PTD according to the present invention.
Figure 4:
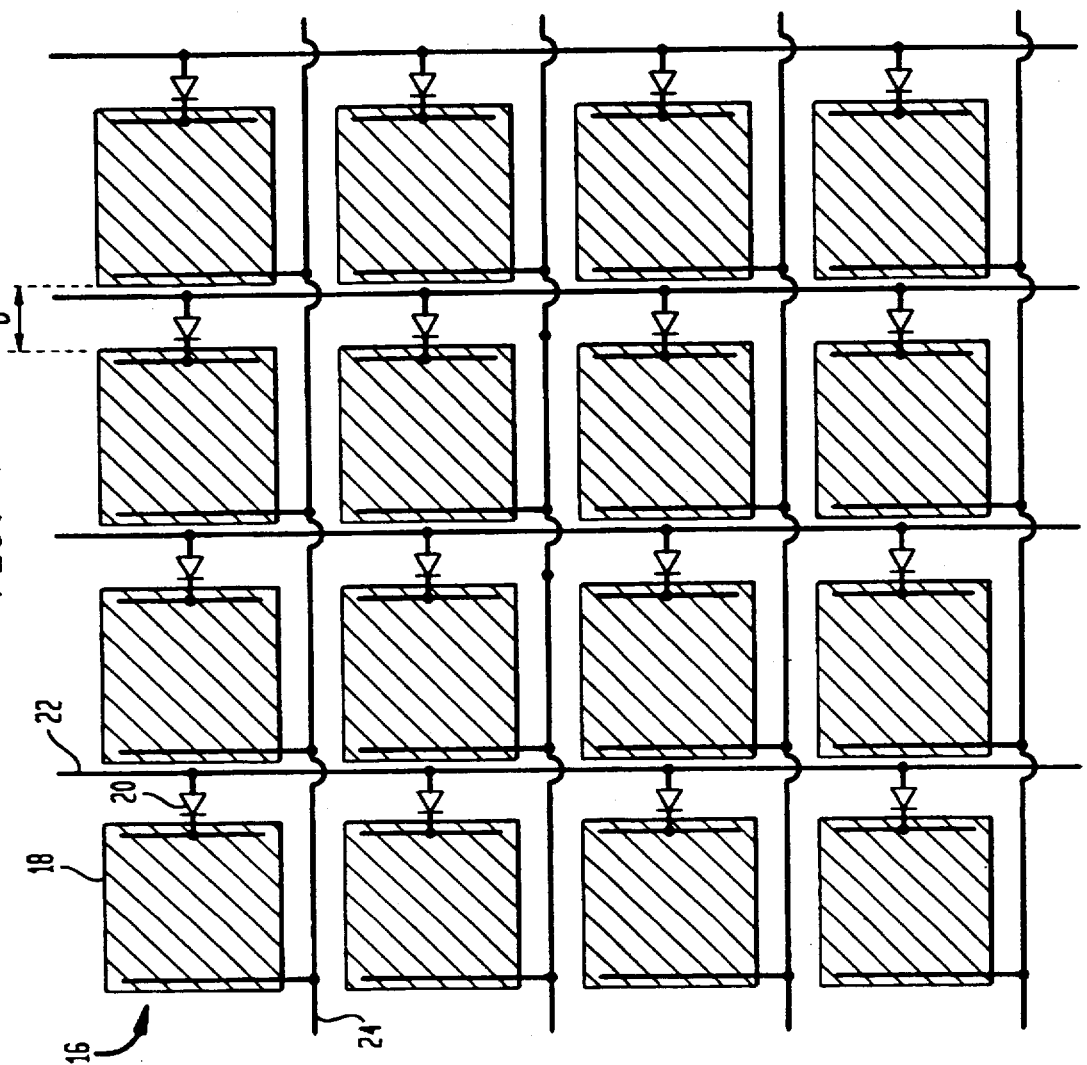
FIG. 4 is a local (within a single stripe) diagram of the array of the Phase Transition Display (PTD) according to the present invention.

Referring to FIG. 4, there is shown a diagram of the architecture 16 of a small area of the Phase Transition Display (PTD) according to the present invention. It consists of a plurality of individual VO2-based pixels 18 arranged in a conventional two-dimensional matrix array which is adaptable to be fabricated on a Silicon substrate (not shown). Each pixel 18 is interconnected by a column and a row lines 22,24, similar to other flat panel displays. Coupled between each pixel 18 and column line 22 is a diode, implemented as a p-n junction, 20, which is also fabricated on the Silicon substrate. The diodes 20 are utilized to prevent current spread and possible cross-talk between the pixel elements 18. Without the diodes, the current spread in such an architecture is inevitable since there are four nearest loops of parallel connection around each pixel through three neighboring pixels. The diodes 20 being placed as shown, block twice the unwanted currents in each loop. The architecture 16 of the present invention is desirable because it utilizes a "passive matrix" addressing scheme in a monolithic structure. As described in the prior art section and shown in FIG. 5, this scheme consists of data being received in parallel from all columns while a particular row is selected by a sequential row pulse. Because of a short pixel response time, controlled by the speed of heating of the VO2 film by the heater, and short heat dissipation time (which will be discussed below), the architecture 16 of the present invention can use pulses narrower than 1 us. Short turn-on and turn-off times is the important characteristic of the PTD. This allows driving a larger number of pixels with a high speed, thus providing video frequencies for a high resolution flat panel display operation.

Figure 6:
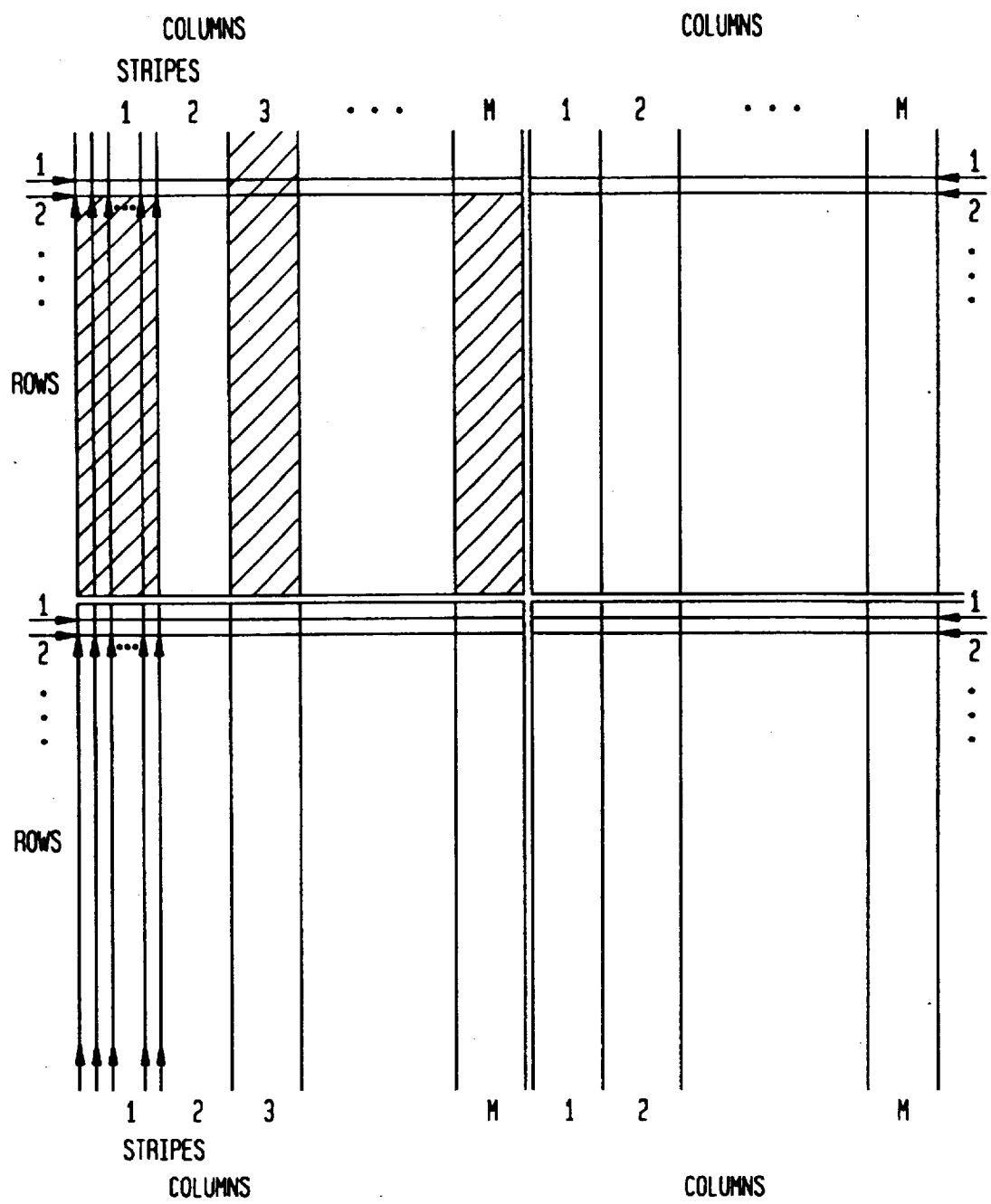
FIG. 6 is a diagram illustrating the addressing scheme of the entire display utilized by the Phase Transition Display (PTD) according to the present invention.

The use of the "passive matrix" scheme is also desirable because it does not require fabrication of transistors, as in active matrix LCDs. This significantly affects the yield and manufacturing costs, since fabricating p-n junctions on Si is standard and has very high yield. Referring to FIG. 6, there is an important modification of the traditional passive matrix architecture, caused by the fact that each pixel is activated by the heater possessing a relatively low resistance. In this case, the total current from all activated pixels in one row is large and flows to a single driving row input, thus producing a current crowding there. This creates a significant potential drop across the contact leads at the row input and increases the contact temperature, both phenomena having spatial variation over the display area.

To minimize these undesirable effects, a new driving scheme is proposed. The entire display area is subdivided into parallel stripes, each stripe containing only a small fraction of the total number of the columns. Signal processing is accomplished by a sequential driving of the stripes, one after another. Each new stripe starts after complete (from first to the last row) processing of the previous one. Since the total current is determined in this case by a number of columns in each stripe, at large number of the stripes M the current crowding effect will be strongly reduced.

Figure 7:
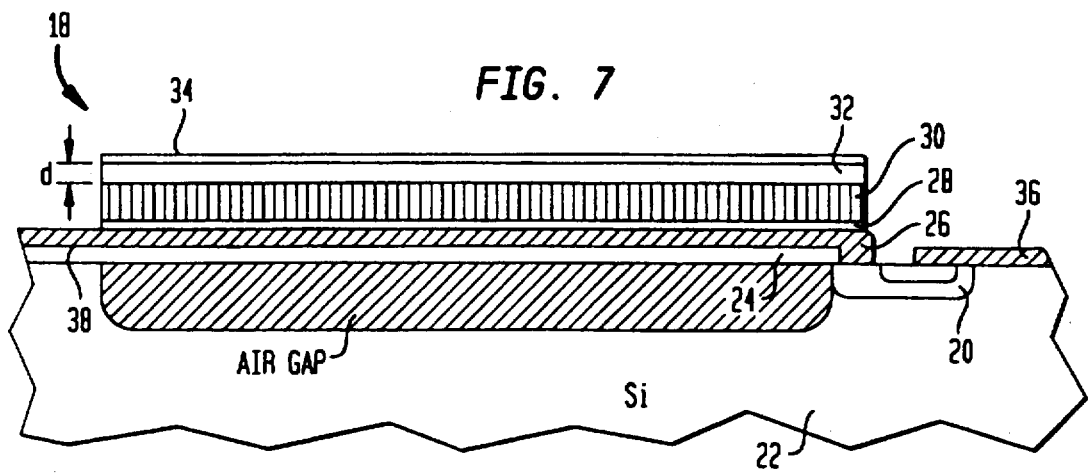
FIG. 7 is a side view of an individual pixel included in the Phase Transition Display (PTD) according to the present invention.

Another display feature shown in FIG. 6, is related to further decreasing the pixel current amplitude due to increase of the total number of drivers to 4. The display area is subdivided into 4 quadrants with separate drivers for each of them. This allows increasing 4 times the heater current pulse width, thereby reducing the current pulse amplitude. As shown below in more detailed analysis, these improvements strongly reduce the current crowding effect and lower the driving current. Referring to FIG. 7, a side view of an individual pixel included in the Phase Transition Display (PTD) according to the present invention is shown. To increase the heat dissipation time from the pixel, the latter, 18, is fabricated as a thin membrane suspended over the recessed area in the Si substrate 22 by using the MM technology (see below). The pixel layer structure comprises the first insulating film 24, the heater element 26, the insulating film 28, the mirror film 30, the VO2 film 32 and the top protective layer 34. The pixel structure is attached to the substrate through narrow bridges 36 made from insulating material, such as Silicon Nitride. The first insulating film 24 holding the entire pixel structure is preferably a 50 nm-thick film of Silicone Nitride. It is also needed to protect the metal heater film when the sacrificial layer is chemically etched in the recessed areas. To minimize a lateral heat flow along this film to the substrate, the film is connected to the substrate via narrow bridges. The heater 26 is preferably a film of Nickel Chromium (NiCr) having a thickness of ~50 nm. The heater element 26 is utilized to provide heat to the pixel 18 in order to induce the phase transition in a VO2 film 32 located above. While the heater element 26 is disclosed as a thin layer of NiCr, other materials, such as high resistive Aluminum or polysilicon, can be utilized as well. Power is applied to the heater 26 through a pair of narrow contacts 38, 40 made from NiCr and disposed over the above discussed Silicone Nitride bridges. The use of NiCr as a material for the contacts 38, 40 is caused by a necessity to minimize the heat transfer to the substrate: among the conductors, NiCr possesses a relatively low coefficient of thermal conductance. The alternative material for the contacts 38, 40 is heavily doped polysilicon, which also has high electrical resistance and relatively low thermal conductance. The first contact 38 which is disposed over the insulating bridge 36 is coupled to the heater element 26 through the p-n junction, with the heater 26 connected to n-side and contact 38 to p-side of the p-n junction. The second contact 40 is also disposed over the bridge 36 and directly coupled to the heating element 26.

Disposed over the heater element 26 is a second insulating film 28 which is preferably a film of Aluminum Oxide (Al2O3). The second insulating film 28 is utilized to isolate a mirror element 30 located above, from the heating element 26.

Disposed over the second insulating film 28 is the mirror element 30 which is preferably a film of Aluminum. While Aluminum is described, other highly reflective materials can be utilized such as Vanadium, Silver and so on.

Disposed over the mirror element 30 is the film of VO2 32. As previously described, the VO2 film 32, along with the mirror element 30, forms an optical resonator, which modulates light utilizing the phase transitions of the VO2 32. The VO2 film 32 along with mirror element 30 determines the reflective coefficient (R) of each pixel 18, which depends on the phase state of the VO2 film 32. The VO2 32 along with the mirror 30 creates either a constructive interference pattern or a destructive one depending on the phase state of the VO2 film 32 and the wavelength of light being modulated. The constructive interference pattern provides the maximum value of R for each pixel 18, while the destructive interference provides the minimum value of R.

Grown and disposed over the VO2 32 is a protective layer 34, which is also a part of the optical resonator and is preferably a film of Vanadium pentoxide (V2O5). The protective film 34 represents a stable and transparent insulator in the temperature range of interest. Both the VO2 32 and protective film V2O5 34 can be deposited in the same process and grown sequentially under different oxygen pressure.

The above described thermal insulation of each pixel makes heat transfer from one pixel to another greatly reduced. This implies that the temperature induced cross talk between the pixels is negligible.

Figure 8:
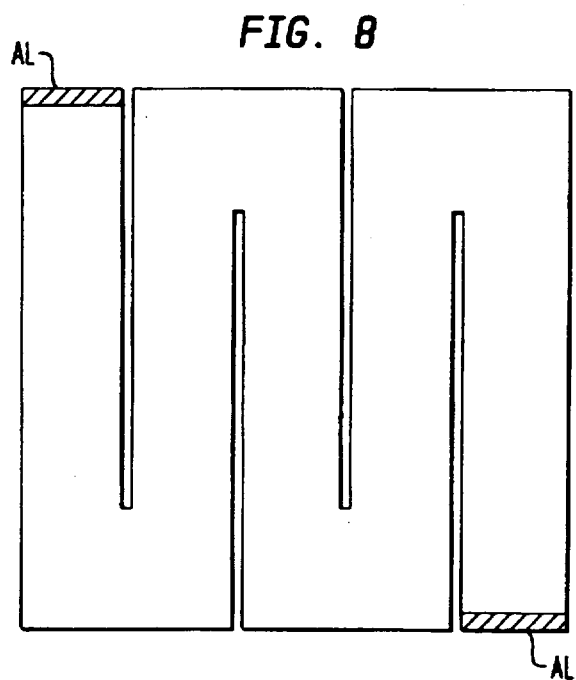
FIG. 8 is a top view of the another embodiment of the individual pixel included in the PTD according to the present invention.

Additional reduction of the electrical current through the heater is possible by increasing the heater film resistance due to new shape of the heater surface, as shown in FIG. 8. To increase the film resistance, a "zig-zag" shape of the heater, as well as the VO2 film on top of it, is made. If a 100 nm-thick Ni—Cr film is used for the heater, its resistance will be increased from 50 Ω to a suitable value of R=1 KΩ by introducing 4 notches in the 100×100 μm2 pixel area, thus reducing both the pixel current amplitude and the current crowding effect.

Figure 9:
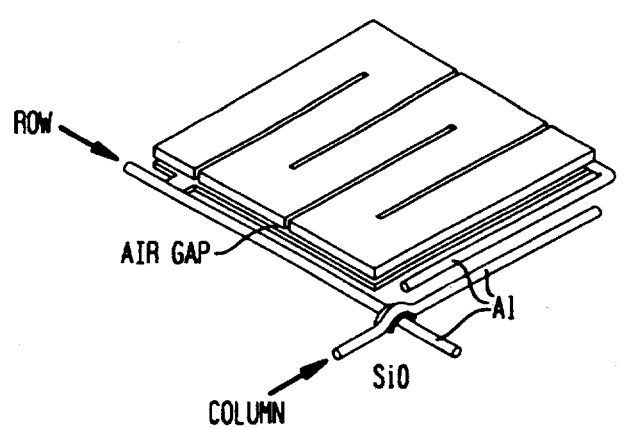
FIG. 9 shows the sketch of the pixel according to the present invention.

Referring to FIG. 9, the sketch of the pixel, which includes the air gap, is shown. Creation of the air gap between the free standing structure (beams, membranes) and the Silicone substrate is a well established process and used in many types of micro-fabricated devices and arrays. The pixel fabrication starts from formation of the p- and n- areas on the substrate, between the pixels, either by implantation or dopant diffusion. It is followed by growth of the pixel supporting film of Silicon Nitride and then by a sequential deposition of the heater film, the insulating Silicon Nitride film, the VO2 film and the top protective film. After the photolithography patterning of the pixel which includes formation of the above discussed meander shape of the structure, the Si substrate is chemically etched through openings in the Silicon Nitride film. Due to crystallographic anisotropy of the chemical etch in Silicon, the resultant air gaps represent inverted pyramids beneath each pixel, and the etching process stops at the pyramid point. One of the heater's contact is then connected to the n-side of the p-n junction by the Aluminum wire, while the column Aluminum lead is connected to the p-side of the p-n junction and the row Aluminum lead is connected to second contact to the heater.

Figure 10:
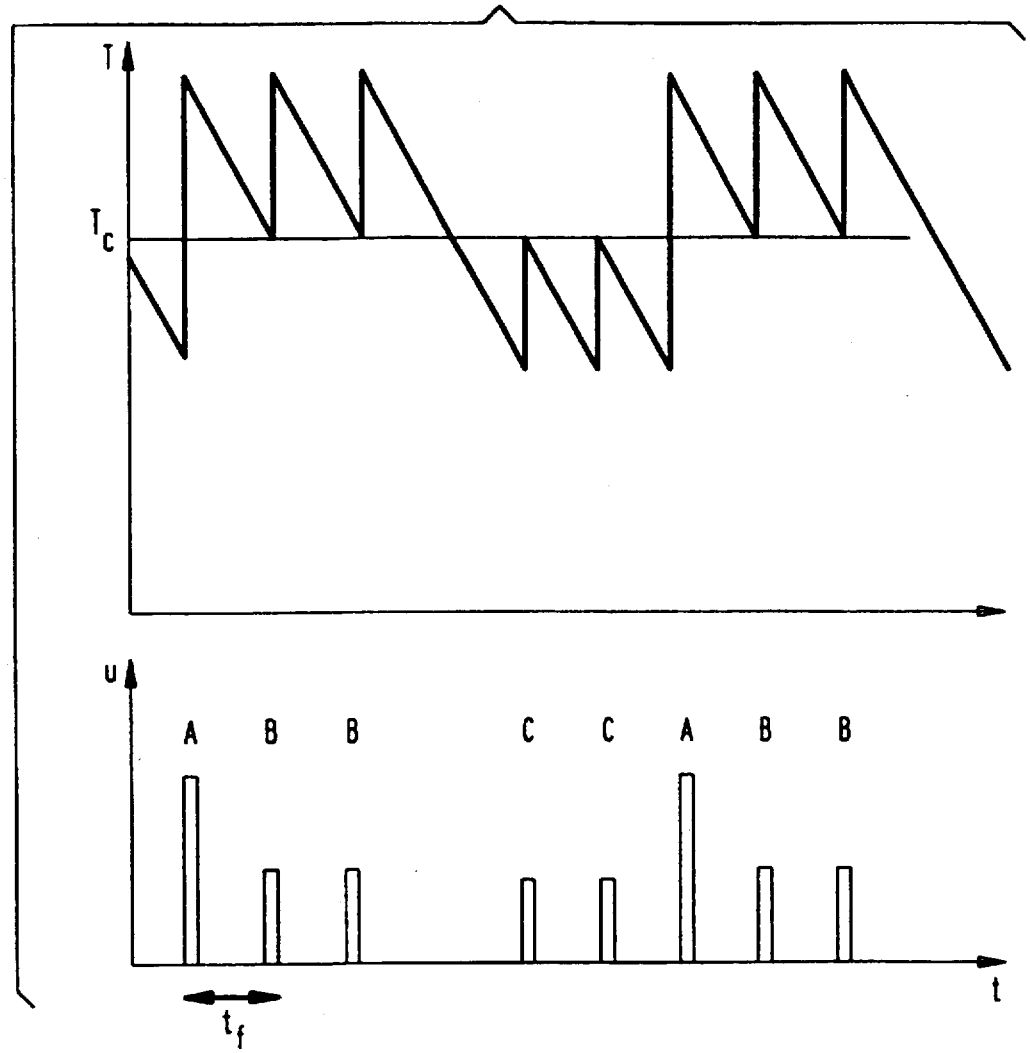
FIG. 10 is a graph illustrating the kinetics of the pixels included in the Phase Transition Display (PTD) according to the present invention.

Referring to FIG. 10, there are shown graphs illustrating transient characteristics of the pixels according to the present invention. During the operation, a short electrical pulse, powerful enough to raise the temperature of the pixel above the $T_c$, is applied to the heater of a particular pixel, which transfers the VO2 film to the metal state. This transition causes the brightness and color of the pixel to be changed, for example from a yellow green to a dark green. At the end of the pulse, temperature decreases with time. The main feature of the kinetics is the fact that pixels in both "on"-(metallic) and off- (insulating) states remain there for a relatively long time, while the phase changes occur rarely. To permanently maintain the pixel in the metallic state, the pulse (A) should arrive at a time $t_f$ when the temperature of the pixel is still above the $T_c$. In this case, the frame time $t_f$ and the pulse amplitude are adjusted to keep the pixel in the "on"-state by using a relatively small pulse amplitude, which elevates the pixel temperature only 5–10° C. above $T_c$. The small temperature rise needed in this case, ΔT=5–10° C., implies lower driving power. On the other hand, because of the strongly non-linear kinetics of the heat dissipation, it is beneficial to keep the pixels in the "off"-state also at high temperature, 5–10° C. below $T_c$. This allows better control over the heat dissipation process in the display. The temperature $T_c$ thus becomes a reference point of the heat kinetics with only 10–20° C. deviation from $T_c$. Such a narrow departure from the $T_c$ is possible in high quality films, where the hysteresis of the phase transition only of a few ° C. is present.

The phase transition to the "on"-state requires the temperature rise of ~20° C. Furthermore, an additional latent, heat is needed to accomplish the phase transition to the metal state. Therefore, the phase transitions are more energy consuming than the transitions within the same state. Thus, the reduction of the number of the phase transitions is desirable. This will be discussed later in the context of the gray levels.

Calculations of the power required to perform the pixel modulation show that with the vacuum gaps and optimized device parameters and driving scheme, the required maximum power, with all pixels activated, is expected to be in the range of ≦0.1 W per inch$^2$ of the display area.

Below, an example of more detailed analysis of the display power consumption is presented. We estimated first the power needed to drive the pixels in non-adiabatic process, i.e. when the characteristic heat dissipation time is much longer than the driver pulse time. We will include the dissipation time later for the estimates of the pulse repetition rate. The power (Q1) to drive a single pixel having an area of 100×100 um$^2$ and a thickness of 100 nm to a change in temperature ΔT is calculated using the following equation:

$$Q1=Cm\Delta T \qquad (4)$$

where C is the heat capacity of the VO2 film and m is the film mass. Another component of the energy required, Q2, originates from the latent heat, which is associated with the first order phase transition:

$$Q2=L_o m \qquad (5)$$

For VO2 $L_o$=1020 cal/mole, and this energy is typically of the order of Q1. Thus, the total energy necessary to drive one pixel from "off"- to "on"- state is:

$$Q=Q1+Q2 \cong 2Q1 \qquad (6)$$

In the case of 10$^6$ pixels arranged into the matrix of 1000 rows×1000 columns, with the number of stripes M=100, the number of columns in each stripe will be 10. We assume now that all the pixels are "on" (i.e. previously transferred into the metallic state, and Q2=0), and the temperature rise needed to keep all the pixels in the "on"- state is ΔT=10° C. With C=25 J/(mole K), the total energy per pixel Q=Q1= 1.6×10$^{-8}$ J. We assume in the first approximation that the temperature decay time of the pixel is 10 ms, and therefore the frame frequency for the display operation is 100 Hz. To drive one display quadrant (50 stripes, 500 rows in each stripe) with this frequency, one needs the time per pixel $t_p$=4.10$^{-7}$s. This time yields the power per pixel $P_p$=Q/$t_p$≅0.04 W. This gives the DC power for one driver, sequentially driving 10 pixels at any time, of 0.4 W, thus yielding the total power for the display of 10$^6$ pixels P=1.6 W (~0.1 W per inch$^2$ of the display area).

At the chosen frame frequency of 100 Hz, the current amplitude I and the voltage V per pixel are:

$$I=(Q/R \cdot t_p)^{1/2}; \ V=(Q \cdot R/t_p)^{1/2} \qquad (7)$$

The above discussed parameters, Q and $t_p$, yield for R=1KΩ the pulse characteristics: I=6.3 mA and V=6.3 V per pixel. Driving 10 columns in one stripe requires the driver current of 63 mA.

To transfer the pixel from "off" - to "on"-state, however, one needs ΔT≅20° C., so that the energy Q will be doubled. This yield $P_p$=0.16 W. Since these transitions are rear, one can conservatively estimate the total power P, needed to drive all the pixels, in the range of 1–2 W. Finally, with the total current in the stripe of 63 mA and the Al wire resistance per pixel of 0.15 Ω one obtains a rather low potential drop across the pixel wire ΔV=9.5 mV, which makes the current crowding effect negligibly small.

All the above estimates are valid only for the short period of the pulse time $t_p$, when the heat dissipation process is negligible. For the thin film disposed over the silicon wafer, the heat conduction process is very strong, yielding characteristic dissipation times $t_d$ much shorter than 1 ms and thereby dramatically increasing the power required for the display operation. To increase the $t_d$, one has to thermally isolate the active pixel by using the material possessing extremely low coefficient of thermal conductivity. The best approach, regularly utilized in the fabrication of the heat sensing arrays, is to use the vacuum gap between the pixel and the wafer. Estimates, which take into account all possible heat dissipation processes, such as:

i. direct heat transfer through the air gap;

ii. the lateral heat transfer to the substrate through both the contacts and membrane support; and iii. the heat radiation process show that with air gaps under vacuum the temperature decay time can be kept in a reasonable range of 2–10 ms. These numbers agree with both the estimates and experimental results obtained in the prior art and justify the above presented calculations.

Figure 11A:
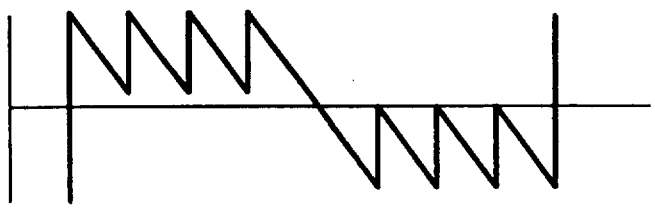
FIGS. 11a and b are the graphs illustrating digital approach for producing the gray levels in the PTD according to the present invention.
Figure 11B:
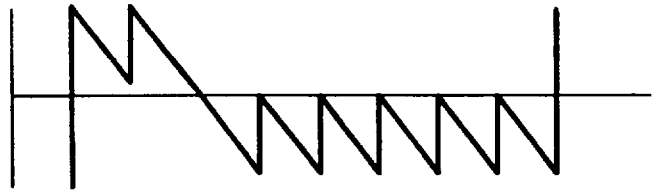

The above discussed display mode of operation allows digital producing of the gray levels. As shown in FIGS. 11a,b, it relies on averaging the number of the "on"- and "off"- states occupied by each pixel over the frame period. The number of the gray levels is determined by the expression p−1, with p=$t_f/t_r$ where $t_f$ is the pulse repetition period. For example, for $t_f$=50 ms and repetition period $t_r$=3 ms, p≅17, and the number of the gray levels is 16. As discussed before, the number of the phase transitions for each gray level is mninimized to reduce the operational power. For this purpose, all "on"- states are repeated sequentially and kept separately from "off"-states. That means that only one phase transition per each frame is needed to produce the gray level.

Figure 12:
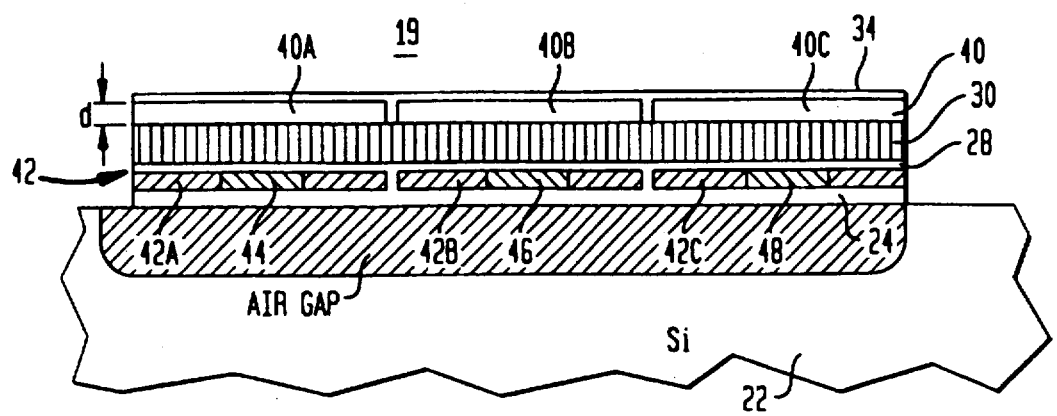
FIG. 12 is another embodiment of the pixel for producing the color in the PTD according to the present invention.

Referring to FIG. 12, a side view of another embodiment of an individual pixel included in the phase transition display according to the present invention is shown. This embodiment 19 includes many of the same elements which function similarly as described previously in regard to the embodiment of FIG. 7. Thus, only the differences in the present embodiment of the pixel 19 will be described. These differences include the pixel 19 shown in FIG. 7 having a heater element 40 and VO2 film 42 which are sub-divided into three sections in order to enable color operation of the Phase Transition Display according to the present invention.

As previously discussed, the optical properties of the pixels according to the present invention are controlled by the resonant conditions of the two light beams reflected from the VO2 film and mirror element. An appropriate choice of structure parameters enables fabrication of pixels with the highest reflection contrast ratio at the phase transition for red, green and blue spectral regions. Thus, each pixel according to the present invention is sub-divided into three sub-sections having three different thicknesses of the VO2 film and separate electrical access to each heater in order to provide three different resonant conditions for the red, green and blue spectral regions.

During operation, power is selectively supplied to each of the heating sections 42A, 42B, 42C according to the data supplied to each pixel 19. This causes heat to be selectively supplied to the associated VO2 sections 40A,40B,40C located above, which selectively transitions each of these sections 40A,40B,40C between the insulator and metal states. These transitions in the VO2 sections 40A,40B,40C correspond to a change in the index of refraction, which as previously described causes the appropriate red, green and blue wavelengths of light to be selectively modulated in order to produce color images.

The contrast ratio of the pixel 19 is further enhanced by the protective coating 34 having anti-reflective properties disposed over the VO2 film 40 which is preferably a film of V2O5.

The resonant reflective conditions affect the viewing angle α. In order to estimate the viewing angle, the wavelength range Δλ is considered in which the contrast ratio is sufficiently high. A reasonable contrast ratio is achieved within Δλ=50 nm, which is equivalent to resonator thickness variation ΔL given by the following equation:

$$\Delta L = L \; tg(\alpha/2) = \Delta\lambda/n \tag{8}$$

For a VO2 film thickness L=60 nm and an index of refraction n=2.5, one obtains a viewing angle ranging from 35 to 40°.

Figure 13:
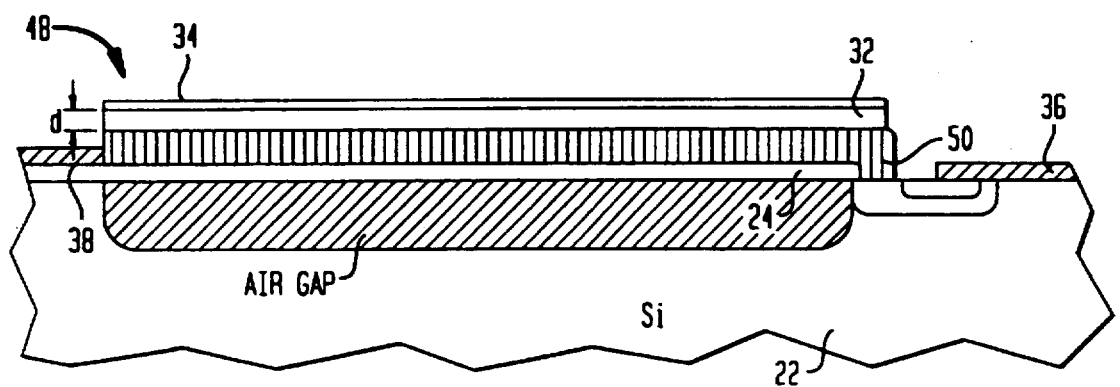
FIG. 13 is a side view of a further embodiment of the pixel in the PTD according to the present invention.

Referring to FIG. 13, a side view of another embodiment of the individual pixel of the PTD is shown.

This embodiment includes many of the same elements as described previously in regard to the embodiment of FIG. 7. Thus, only the difference in the present embodiment will be discussed. In this embodiment 48, a combination heater/mirror element 50 is utilized. The heater/mirror element is disposed directly on the first insulating layer 24 and is coupled to both contacts 36, 38 as shown. Such a configuration is desirable, since the heater delivers the heat directly to the active VO2 film. It also eliminates the need for a separate mirror element and a second insulating layer. During the operation, the heater/mirror element 50 along with the VO2 32 forms an optical resonator to perform the optical modulation.

The Phase Transition Display (PTD) according to the present invention has a number of advantages over conventional Flat Panel Displays. The PTD is superior to LCD Displays in many categories. The advantages include the use of a passive matrix architecture fabricated on the Si substrate, which results in low cost and high yield. The speed of the PTD can be adjusted in the fabrication process, enabling video frequencies. The PTD also has a high resolution. Color operation is achievable in the PTD as a combination of phase transition and optical resonance without requiring a color filter thereby reducing the light power consumption While the invention has been particularly shown and described with reference to preferred embodiments thereof it will be understood by those skilled in the art that changes in form and details may be made therein without departing from the spirit and scope of the present invention. For example, a number of preferred materials and processes have been described for the Phase Transition Display (PTD) according to the present invention, but other equivalent materials and processes such as evaporation and other thin film deposition techniques are also encompassed by the present invention.

What is claimed is:

1. A display device including a plurality of pixels arranged in a predetermined configuration, each said pixel comprising:

a substrate;

a heater film disposed over said substrate;

a mirror element disposed over said heater film;

a light modulating material disposed over said mirror element for selectively modulating reflectivity (R) of a predetermined wave length of light received from an external source by transitioning between a first and a second state, wherein said material in said first state has an index of refraction which causes destructive interference in the predetermined wave length of light which results in a low reflectance from said material and in said second state has an index of refraction which causes constructive interference in the predetermined wave length of light which results in a high reflectance from said material; and an air gap created underneath the heater film to increase the dissipation time to an acceptable level of 1–10 ms which is needed for efficient display operation.

2. The device of claim 1, wherein said predetermined configuration of said pixels is a two dimensional matrix.

3. A display device including a plurality of pixels arranged in a predetermined configuration, each said pixel comprising:

a substrate;

a heating element disposed over said substrate;

a mirror element disposed over said heating element;

a light modulating material disposed over said mirror element for selectively modulating reflectivity (R) of a predetermined wave length of light received from an external source by transitioning between a first and a second state, wherein said material in said first state has an index of refraction which causes destructive interference in the predetermined wave length of light which results in a low reflectance from said material and in said second state has an index of refraction which causes constructive interference in the predetermined wave length of light which results in a high reflectance from said material; and an air gap created underneath the heating element to increase the dissipation time to an acceptable level of 1–10 ms which is needed for efficient display operation.

4. The device of claim 3, which further includes a p-n junction coupled to said heating element.

5. The device of claim 3, which further includes a first insulating and film supporting layer disposed between said substrate and said heating element.

6. The device of claim 3, which further includes a second insulating layer disposed between said heating element and said mirror element.

7. The device of claim 3, which further includes a protective coating disposed over said light modulating material.

8. The device of claim 7, wherein said Vanadium Dioxide is doped by transition metal elements Niobium and Tungsten.

9. The device of claim 3, wherein said light modulating material is Vanadium Dioxide (VO2).

10. The device of claim 3, wherein said light modulating material is divided into three sections of two thicknesses in order to enable color operation.

11. A display device including a plurality of pixels arranged in a predetermined configuration, each said pixel comprising:

a semiconductor substrate having a recess;

a heating element disposed over said semiconductor substrate above said recess;

a mirror element disposed over said heating element;

a light modulating material disposed over said mirror element for selectively modulating reflectivity (R) of a predetermined wave length of light received from an external source by transitioning between a first and a second state, wherein said material in said first state has an index of refraction which causes destructive interference in the predetermined wave length of light which results in a low reflectance from said material and in said second state has an index of refraction which causes constructive interference in the predetermined wave length of light which results in a high reflectance from said material, wherein said recess creates an air gap underneath the heating element to increase the dissipation time to an acceptable level of 1–10 ms which is needed for efficient display operation.

12. A display device including a plurality of pixels arranged in a predetermined configuration, each said pixel comprising:

a silicon semiconductor substrate;

a heating element disposed over said substrate;

a mirror element disposed over said heating element;

a light modulating material disposed over said mirror element for selectively modulating reflectivity (R) of a predetermined wave length of light received from an external source by transitioning between a first and a second state, wherein said material in said first state has an index of refraction which causes destructive interference in the predetermined wave length of light which results in a low reflectance from said material and in said second state has an index of refraction which causes constructive interference in the predetermined wave length of light which results in a high reflectance from said material; and an air gap created underneath the heating element to increase the dissipation time to an acceptable level of 1–10 ms which is needed for efficient display operation.

13. A display device including a plurality of pixels arranged in a predetermined configuration, each said pixel comprising:

a substrate;

a heating element disposed over said substrate, wherein said heating element also functions as a mirror element;

a light modulating material disposed over said heating element for selectively modulating reflectivity (R) of a predetermined wave length of light received from an external source by transitioning between a first and a second state, wherein said material in said first state has an index of refraction which causes destructive interference in the predetermined wave length of light which results in a low reflectance from said material and in said second state has an index of refraction which causes constructive interference in the predetermined wave length of light which results in a high reflectance from said material, and an air gap created underneath the heating element to in crease the dissipation time to an acceptable level of 1–10 ms which is needed for efficient display operation.

* * * * *